Oct. 18, 1960 W. C. LAMPHIER 2,957,114
CAPACITOR CONSTRUCTION
Filed Sept. 10, 1958

*INVENTOR.*
WALTER C. LAMPHIER
BY *Connolly and Hutz*
HIS ATTORNEYS

United States Patent Office 2,957,114
Patented Oct. 18, 1960

2,957,114

CAPACITOR CONSTRUCTION

Walter C. Lamphier, Williamstown, Mass., assignor to Sprague Electric Company, North Adams, Mass., a corporation of Massachusetts Filed Sept. 10, 1958, Ser. No. 760,112

5 Claims. (Cl. 317—260)

This invention relates to convolutely wound capacitors and more particularly to convolutely wound capacitors having a composite dielectric between foil electrodes with one element of the composite dielectric being a moisture resistant high volume resistivity resinous film.

Convolutely wound capacitors are composed of a pair of foil electrodes and sheets or layers of dielectric material interposed between the convolute turns of the foil electrodes, so as to ensure separation of the electrodes. The foil electrodes of convolutely wound capacitors present extremely long areas of interface between electrodes of different potential. Throughout the length of these long interfaces on both sides of each of the electrodes the dielectric layers must maintain conditions to ensure the capacitive characteristics of the capacitor. At least part of the function of these dielectric layers is the electrical insulation of electrodes of different potential from each other. As a result of this electrical potential, an electrical stress is applied across the interposed space and material. Electrical leakage between the electrodes across this space must be minimized or eliminated. It is important that there be an effective insulation of the electrodes from each other.

In convolutely wound capacitors leakage of electrical current across the space between electrodes and partly adjacent turns of electrodes is a constant problem. The prevention of such leakage dictates many of the materials employed in capacitor construction. The prevention of electrical leakage in capacitors subject to moisture is a particular problem. For example, at high humidity the paths of leakage are more readily found by the electric current and leakage currents are therefore more likely. Capacitors which are not sealed in metal cans ars subject in varying degrees to the pick-up of moisture, particularly during storage and operation under humid conditions. It is thus seen that a device which increases the resistivity of capacitor insulation under problem conditions of moisture will be useful in capacitors.

It is an object of this invention to provide a convolutely wound capacitor which resists electric leakage.

It is another object of this invention to provide a convolutely wound capacitor having good electrical resistance characteristics in a non-hermetically sealed container.

It is a still further object of this invention to provide a capacitor including paper in the capacitor dielectric and having good reliability under operation at high voltages.

A still further object of this invention is to provide a convolutely wound capacitor having paper as one of the dielectrics exhibiting superior electrical characteristics under moist conditions of storage and operation.

These and other objects of this invention will become more apparent upon consideration of the following description taken together with the accompanying drawing in which.

In general the objects of this invention are attained by a convolutely wound capacitor having a composite dielectric comprising at least one layer of porous absorbent material and at least one layer of non-porous non-absorptive material. The relative widths of the two materials, and the manner of winding of the capacitors being such that the non-porous layer extends beyond both lateral edges of the porous layer.

In a restricted form of this invention, the objects are attained by a capacitor in which the two electrodes are rolled in non-inductive or extended-foil construction so that one electrode extends from one end of the capacitance roll, and the other electrode extends from the other end of the roll. The composite dielectric is wound into the capacitance section between the two electrodes in such an arrangement that both the relatively narrow porous layer and the relatively wide non-porous layer are between the electrodes throughout the full width of the capacitive overlap of the electrodes. However, it should be understood that the advantages of this invention may be enjoyed in an inductive or tab-wound capacitor in which both layers of dielectric material are wider than the electrode foils and extend beyond both edges of the foils.

To attain the advantages of this invention, the composite dielectric comprises at least one layer of porous material having at least an 8% absorptive characteristic, and at least one layer of non-porous material having only a fraction of 1% absorptive characteristic. Examples of the porous absorptive material are cellulosics such as kraft (sulfate pulp) and beneres (hemp) papers. Examples of non-porous non-absorptive materials are resin films such as polyethylene terephthalate, polycarbonate, polyvinylidene chloride, polytetrafluoroethylene, and polychlorotrifluoroethylene; none of these films absorb any appreciable amount of moisture.

In the preferred embodiment of this invention the composite dielectric, wound into an extended foil capacitor, comprises at least one layer of kraft paper and at least one layer of polyethylene terephthalate (hereinafter referred to as Mylar). For low voltage operation (to 200 v. D.C.) it is preferred to use one layer of kraft and one layer of Mylar. For high voltage (600 v. D.C.) operation it is preferred to use one layer of Mylar between two layers of kraft.

Figure 1:
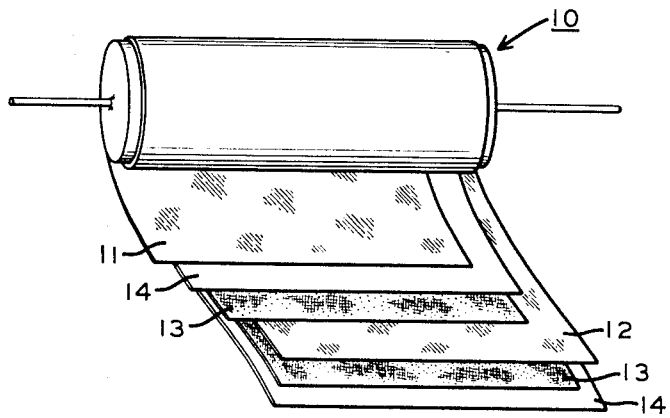
Figure 1 is a perspective view of a capacitor section according to this invention partially unrolled to show the sequence of layers of the convolute windings.

Referring to the figures, Figure 1 shows a capacitor section 10 of convolutely wound layers of material. The layers of material are a pair of foil electrodes 11 and 12 between which is interposed a composite dielectric made up of a paper sheet 13 and a resinous film 14. In the convolutely wound capacitance section 10, the foil electrodes 11 and 12 are wound on each other in extended-foil fashion, with electrode 11 extending from one end of section 10 and electrode 12 extending from the other end, to form a number of concentric turns of foil. Each of the overlapping concentric turns of the foil is separated from a similar and adjacent turn of the oppositely charged foil by a turn of the composite dielectric. The turn of the composite dielectric is made up of paper sheets 13 and resinous film 14. The composite dielectric bears against the surfaces of the foil electrodes 11 and 12.

The following detailed construction is set forth as a specific example of an extended-foil embodiment of this invention. The wound section 10 has an axial dimension which represents the width of the component parts. Accordingly, the widths of the long strip-like foil electrodes 11 and 12, paper sheets 13 and resinous films 14 are axial of the rolled section 10. Paper sheets 13 are ½" wide and 0.25 mil thick; Mylar sheets 14 are ⅝" wide and 0.35 mil thick; and foils 11 and 12 are 9/16" wide and 0.25 mil thick. Foil 11 extends 1/16" beyond Mylar 14 at the left end of section 10, and foil 12 extends 1/16" beyond Mylar 14 at the right end. The resinous films 14 have the fullest width, extending substantially 1/16" beyond the edges of paper sheets 13. Thus, the foil electrodes 11 and 12 form the outer dimension of the capacitance section 10, and the extent of capacitive overlie of the foils is 7/16" with the paper extending 1/16" beyond each edge of the overlie.

Figure 2:
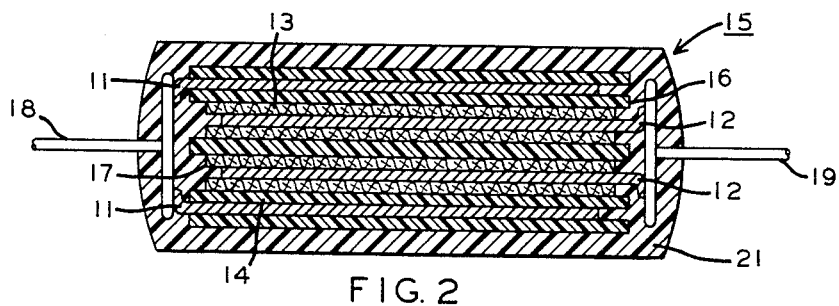
Figure 2 is a sectional view along the axis of a completed capacitor according to this invention encased in a phenolic casing.

Referring to Figure 2 a sectional view along the axis of a finished capacitor 15 containing the capacitance section 10 of Figure 1 shows the convolute windings of the electrodes 11 and 12, the paper sheets 13 and the resinous films 14. The layers wound on each other in the manner of this invention show the cross section of the convolute winding described above. The resinous films 14 have outer edges 16 extending beyond the paper sheets 13 so that there is no current path between foils 11 and 12 without going through a film 14. These edges 16 are somewhat curled over the closed-in or at least partially overlapped ends 17 of the paper sheets 13. Terminal leads 18 and 19 make contact with mashed over foils 11 and 12, respectively, and extend away from the left and right ends of the capacitor 15 as shown in Figure 2. The capacitance section 10 of the capacitor 15 is encased in a resinous casing 21 which is molded completely around the section 10. The capacitance section 10 may be impregnated with a suitable impregnant such as the solid impregnant of n-vinyl carbazole polymer.

In Fig. 2 the dielectric is a composite of a layer of resinous film and a sheet of paper. In this combination of dielectric materials forming the composite dielectric, one type of material is in contact with one of the alternate foils and the other type of dielectric material is in contact with the other foil. It is a feature of this invention that it is not limited to any particular arrangement of the elements of the composite dielectric. The composite dielectric may be a number of layers in a variety of arrangements. An important arrangement of dielectrics for use in this invention is a construction in which the composite dielectric between alternate foil electrodes is made up of two sheets of paper and one resinous film sandwiched between the paper sheets.

Figure 3:
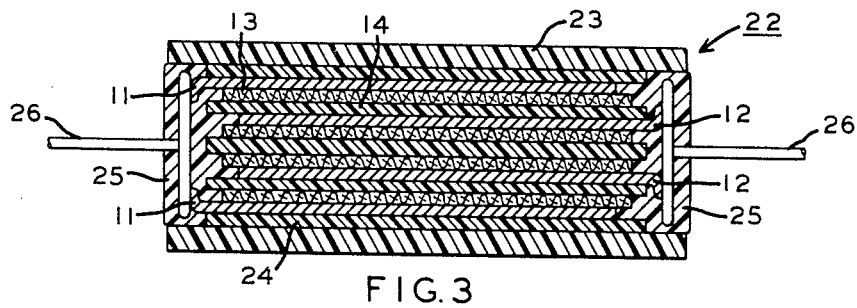
Figure 3 is a sectional view on the axis of a completed capacitor according to this invention contained in a casing closed with an end seal.

Referring to Fig. 3 a capacitor 22 has a casing 23 of suitable material which contains a capacitance section 24. The capacitance section 24 is made up of foils 11 and 12 such as shown and described in connection with Figs. 1 and 2 together with a composite dielectric. The composite dielectric between the respective foils is made up of paper sheets 13 such as shown and described in connection with the embodiment of Figs. 1 and 2 and a layer of resinous film 14 such as was also shown and described in connection with the embodiment of Figs. 1 and 2. The casing 23 is closed at each end with end seals 25. The end seals 25 each have embedded therein a terminal lead wire 26 which is connected to the respective foils 11 and 12. The end seals 25 are against the ends of the capacitance section 24 to tightly close the capacitor 22 against the egress of any of its contents such as an impregnant, and more important the entrance of foreign substances such as moisture.

The resinous film 14 is preferably composed of the polyethylene terephthalate identified by the trademark "Mylar" (E. I. DuPont Company of Wilmington, Delaware). It has been discovered that a capacitance section having the composite dielectric of this invention incorporated in a capacitor results in a capacitor having superior performance in comparison to capacitor devices having otherwise similar composition. In other words, other capacitor devices containing composite dielectrics involving paper sheets and mylar films, but not the construction of this invention, are less effective as capacitors. The extension of the films 14 beyond the paper sheet 13 has been discovered to result in an unexpected change in the insulation value of the composite dielectric. The dielectric is less sensitive to moisture than similar dielectrics having constructions in which the paper and Mylar are coextensive. It has been found particularly advantageous to have the paper sheet 13 adjacent to and in contact with the overlapping film of Mylar. The Mylar film extends laterally of its adjacent paper sheets and foil electrodes to be effectively interposed between a paper sheet and at least one of the alternate foil electrodes. As a result, the Mylar film is interposed so as to eliminate any easy path between a foil of a given charge, its adjacent paper sheet and a foil electrode of the opposite charge. In the case of the Mylar film in a sandwich construction such as described above, a single film 14 does double duty in separating a foil of one charge and its adjacent paper sheet on one side of the film from an electrode of the opposite charge on the other side of the film. At the same time, the second electrode and its adjacent paper film is separated from the first electrode. In addition the paper sheet cooperates in reducing the occurrence of moisture on the surface of the Mylar. Thus, there is no conducting path of moisture available between the foils. This construction provides a combination of features which complement each other to result in a definite lessening of sensitivity of the resultant capacitor to moisture.

As an example of the tab wound embodiment of this invention a .0033 mfd. capacitor was constructed by placing together a 1½ inch film of polyethylene terephthalate (Mylar) which was 0.004 inch in thickness with a 1⅜ inch sheet of kraft paper and a 1 inch aluminum foil of .00025 inch thickness and convolutely winding the three layers through a few turns and then inserting a second strip of 1 inch aluminum foil which is .00025 inch thick and winding the composite layers for several more turns on a mandrel. Two pressed wire tabs were then inserted, one in contact with each of the respective foils and one half turn apart. The tabs extended from opposite lateral sides of the winding. The composite parts were then wound into a capacitance section. The resultant capacitance section was encased in a molded phenolic casing.

Six units assembled according to the above examples were charged with a voltage of 600 v. D.C. The following table shows the resistance in thousands of megohms for each of the units at the end of the enumerated test periods.

Table I

| Units | Test Period of 192 Hours | Test Period of 264 Hours |
| --- | --- | --- |
| 1 | 27 | 10.5 |
| 2 | 78 | 30 |
| 3 | 65 | 30 |
| 4 | 56 | 14 |
| 5 | 43 | ¹ 3.0 |
| 6 | 24 | ¹ 0.2 |

¹ Failures.

Similarly, other capacitors were assembled according to the above extended foil example in capacitances of .0033, .010, .015, .047 and .10 mfd., and rated at 600 v. D.C. The following table shows the results of relative humidity and life tests of the respective capacitors over periods of time.

Table II

| Cap. in mfd. | .0033 | .010 | .015 | .047 | .10 |
|---|---|---|---|---|---|
| 40° C., 95% R.H., 12 units/lot | OK—250 hours—all read 100,000 megohms | | | | |
| 65° C., 95% R.H., 6 units/lot | OK—250 hours—all read 100,000 megohms | | | | |
| 100° C., 100% R.H., 6 units/lot, 192 hours | 24,000 | 48,000 | 27,000 | 100,000 | 48,000 |
| | 27,000 | 56,000 | 39,000 | 100,000 | 48,000 |
| | 43,000 | 78,000 | 39,000 | 100,000 | 56,000 |
| | 56,000 | 78,000 | 48,000 | 100,000 | 56,000 |
| | 65,000 | 100,000 | 78,000 | 100,000 | 56,000 |
| | 78,000 | 100,000 | 78,000 | 100,000 | 65,000 |
| Life test at 125° C., 900 v. D.C., 190 hrs., 12 units/lot | OK | OK | (¹) | OK | OK |

¹ 1 unit failure at 24 hrs.

Life tests of the capacitors similar to those listed in Table II at 125° C. in 12 unit lots under a D.C. voltage of 900 volts for 500 hours resulted in one unit of .0033 mfd. capacitor failure at 240 hours and one .015 mfd. capacitor failure at 24 hours and no other failures.

It has been established that the Mylar paper units of this invention are superior in insulation resistance particularly under conditions of humidity. The advantages of construction of this invention provide a capacitor construction having an ability to operate at high voltages per unit volume of capacitor at any given temperature condition than similar capacitor constructions not containing this invention. This invention has these properties with greater reliability. It also has an improved temperature coefficient of capacity and can be made with a minimum number of units loss in production. Finally, the impregnation of an impregnant along the face of the Mylar resin film can be thorough in winding voids or otherwise eliminating ionization at the interface with the Mylar film.

It is an advantage of this invention that the capacitance section can be incorporated in capacitors in a variety of similar forms. For example, the capacitor of this invention is not sensitive to moisture when contained in a non-hermetically sealed capacitor. Further, the capacitance section can be effectively operated when not encased at all.

This invention has been described above in embodiments which have been set forth for the purpose of illustration. As indicated above, the arrangement of the elements in the composite dielectric may be varied. Similarly, the impregnants and the materials used for casing and end seals may be modified, within the spirit of this invention as defined in the appended claims.

What is claimed is:

1. An electrical capacitor having a resin covered convolutely wound capacitance section comprising electrode elements separated by a composite dielectric spacer, said dielectric spacer comprising at least one layer of porous absorbent material and at least one layer of non-porous non-absorptive material, said layers so constructed and arranged that the non-porous layer extends beyond both lateral edges of the porous layer, and both layers being between said electrode elements throughout the full width of capacitive overlap.

2. An electrical capacitor having a resin covered convolutely wound capacitance section comprising a first electrode extending from one end of said section and a second electrode extending from the other end of said section, said first and second electrodes separated by a composite dielectric spacer, said dielectric spacer comprising at least one layer of porous absorbent material and at least one layer of non-porous non-absorptive material, said layers so constructed and arranged that the non-porous layer extends beyond both lateral edges of the porous layer, and both layers are between the electrodes throughout the full width of the capacitive overlap of the electrodes.

3. The electrical capacitor of claim 2 wherein said porous material has at least an 8% absorptive characteristic, and said non-porous material has less than a 1% absorptive characteristic.

4. The electrical capacitor of claim 3 wherein said porous material is paper, and said non-porous material is a resin film.

5. The electrical capacitor of claim 4 wherein said paper is kraft paper, and said resin film is polyethylene terephthalate.

References Cited in the file of this patent

UNITED STATES PATENTS

| 2,738,453 | Robinson et al. | Mar. 13, 1956 |
| 2,740,732 | Peck et al. | Apr. 3, 1956 |
| 2,806,895 | Lamphier | Sept. 17, 1957 |
| 2,864,982 | Ruscetta et al. | Dec. 16, 1958 |
| 2,872,630 | Cummin et al. | Feb. 3, 1959 |